United States Patent
Syse et al.

(10) Patent No.: US 7,857,356 B2
(45) Date of Patent: Dec. 28, 2010

(54) SMARTCOUPLING—NON RESPONSIVE

(75) Inventors: Harald Syse, Røyneberg (NO); Jostein Aleksandersen, Randaberg (NO)

(73) Assignee: TDW Offshore Services AS, Stavanger (NO)

( * ) Notice: Subject to any disclaimer, the term of this patent is extended or adjusted under 35 U.S.C. 154(b) by 216 days.

(21) Appl. No.: 12/095,222

(22) PCT Filed: Nov. 28, 2006

(86) PCT No.: PCT/NO2006/000435

§ 371 (c)(1),
(2), (4) Date: Jun. 25, 2008

(87) PCT Pub. No.: WO2007/064216

PCT Pub. Date: Jun. 7, 2007

(65) Prior Publication Data

US 2008/0309070 A1    Dec. 18, 2008

(30) Foreign Application Priority Data

Nov. 29, 2005    (NO) .................................. 20055630

(51) Int. Cl.
*F16L 17/00*    (2006.01)
(52) U.S. Cl. ........................ 285/101; 285/276; 285/900; 137/540
(58) Field of Classification Search ............... 285/1, 285/101, 102, 103, 276, 321, 900; 251/149.6; 137/540, 535, 528
See application file for complete search history.

(56) References Cited

U.S. PATENT DOCUMENTS

| 2,727,761 | A | * | 12/1955 | Elliott et al. ................. 285/321 |
| 2,753,195 | A | * | 7/1956 | Palmer ........................ 285/276 |
| 4,683,905 | A | * | 8/1987 | Vigneau et al. ........... 251/149.6 |
| 4,745,948 | A | * | 5/1988 | Wilcox et al. ........... 137/614.05 |
| 5,002,254 | A | | 3/1991 | Belisaire et al. |
| 5,365,972 | A | | 11/1994 | Smith, III |
| 5,385,169 | A | | 1/1995 | Odelius |
| 7,007,983 | B2 | * | 3/2006 | Arosio ........................ 285/316 |
| 7,673,911 | B2 | * | 3/2010 | Liu ............................. 285/276 |
| 2004/0011983 | A1 | | 1/2004 | Maiville et al. |

FOREIGN PATENT DOCUMENTS

| CH | 349461 | 10/1960 |
| DE | 26 23 934 A1 | 5/1976 |
| DE | 19612028 | 10/1997 |
| EP | 0375581 | 6/1990 |
| FR | 2353009 | 12/1977 |
| FR | 2660407 | 10/1991 |
| GB | 1441584 | 7/1976 |

OTHER PUBLICATIONS

PCT Office, "Written Opinion of the International Searching Authority," European Patent Office.

* cited by examiner

*Primary Examiner*—David E Bochna
(74) *Attorney, Agent, or Firm*—Gable Gotwals

(57) ABSTRACT

A coupling according to the invention comprises a first part (1) and a second part (2). The first part (1) comprises a housing (5) with a bore (6) and a slide element (7) arranged movable within the bore (6) and the slide element (7) has two ends (10,11), which both end surfaces (10,11) in a disconnected state of the coupling, are exposed to a surrounding fluid around the coupling.

6 Claims, 2 Drawing Sheets

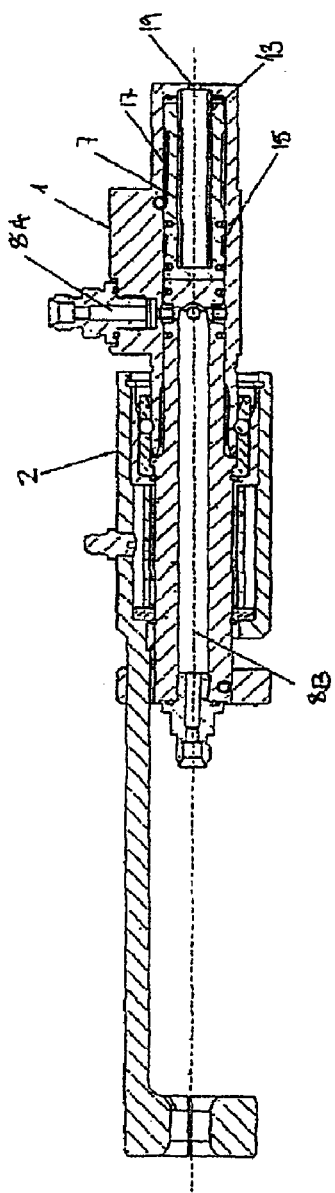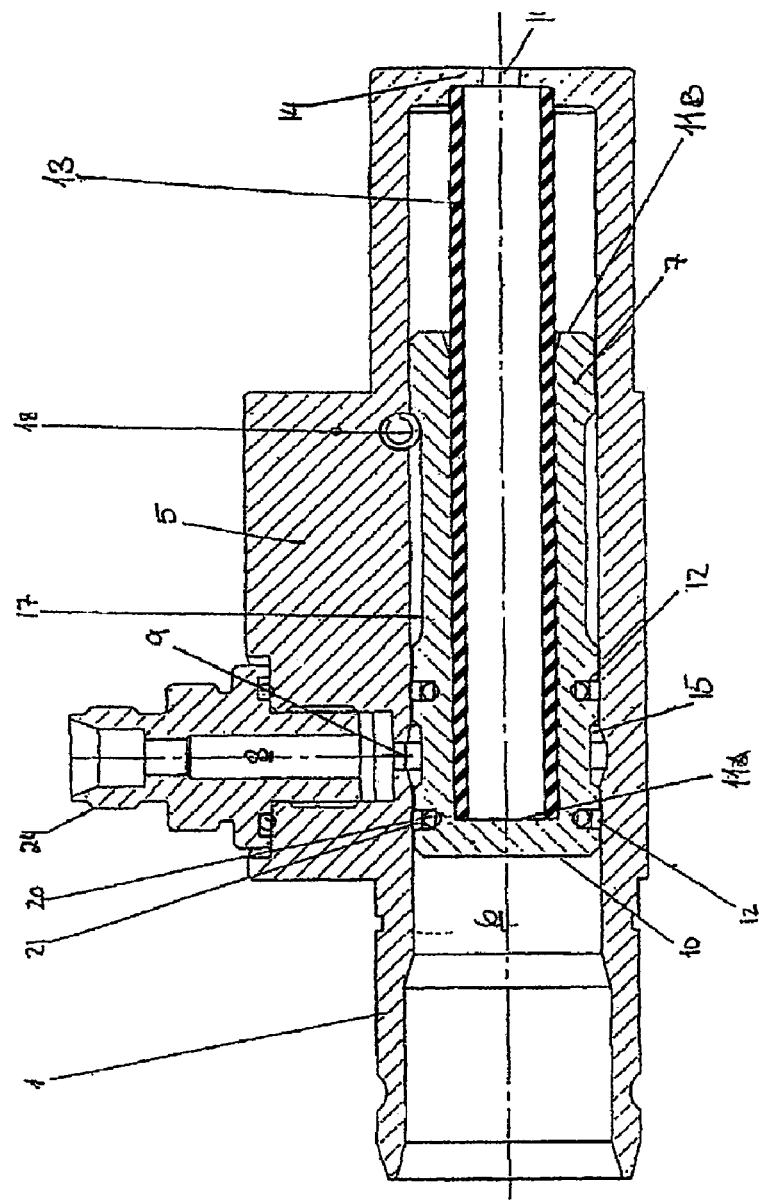
Fig. 1
Fig. 2

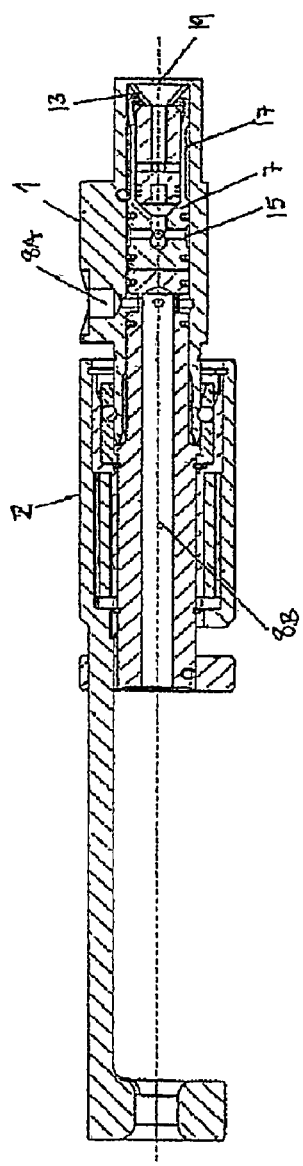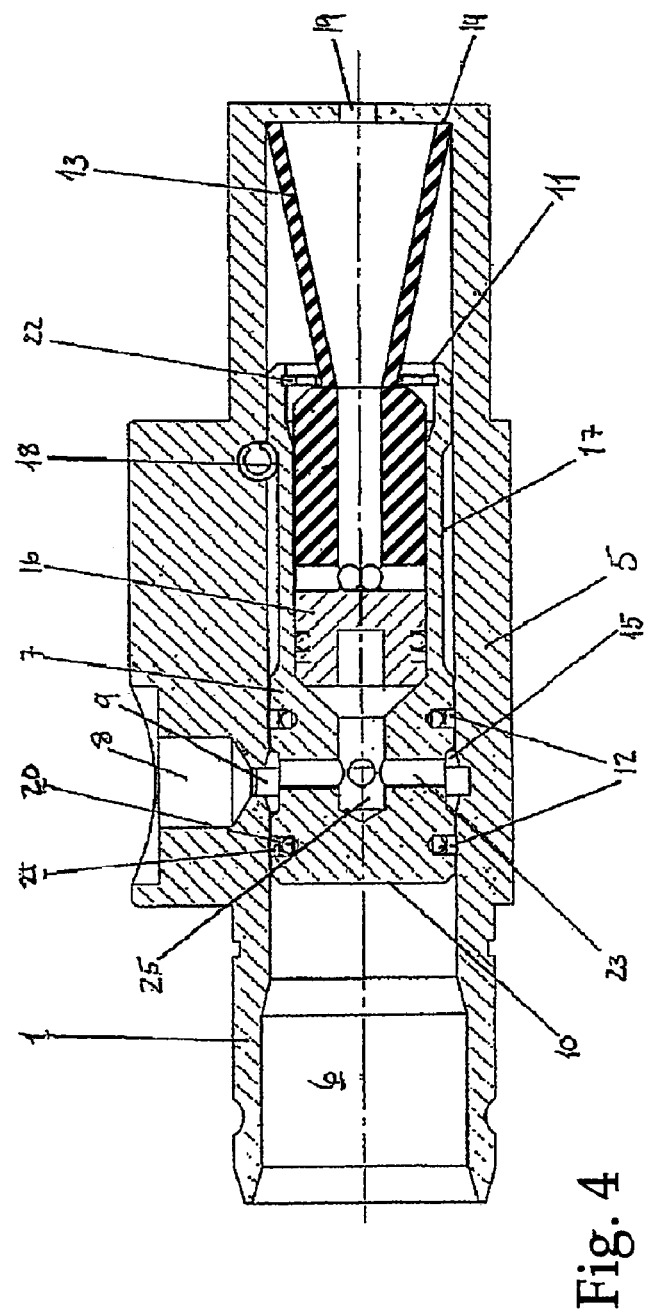
Fig. 3
Fig. 4

SMARTCOUPLING—NON RESPONSIVE

BACKGROUND OF THE INVENTION

Cross-Reference to Related Applications

This application is based on PCT Patent Application No. NO2006/000435, filed on Nov, 28, 2006, which was based on Norwegian Patent Application No. 20055630, filed on Nov. 29, 2005.

FIELD OF THE INVENTION

The present invention regards a coupling comprising a first and a second part, forming a male and a female part, wherein the first part comprises a housing with a bore and a slide element arranged movable within the bore, by connection and disconnection of the second part to the first part.

DESCRIPTION OF RELATED ART

In many applications there is a need to connect for instance fluid lines of two different elements into one continues fluid line for transferal of the fluid, this may be done by a coupling. In many cases there is a pressurized fluid that should be transferred through the coupling and there is a need to close off the fluid line in at least one of the parts of the coupling when the coupling is disconnected. There may also be a need for having these couplings easily connected and disconnected. These types of couplings are often referred to as quick-couplings.

One example of such a coupling is described in for instance U.S. Pat. No. 4,683,905. This coupling comprises of two parts with elements that are pre-tensioned and moved when the two parts are joined, to form a fluid path from the one part to the second part allowing fluid to flow through the coupling and where the flow path in the one part of the coupling is closed when the coupling is not connected. This coupling is however pressure sensitive in relation to the pressure of the fluid surrounding the coupling parts, in that if there is a large pressure in the surrounding fluid, the fluid path may inadvertently be opened if the pre-tension of the elements is not strong enough to counteract the pressure of the surrounding fluid.

From U.S. Pat. No. 5,002,254 there is known an automatic coupler for pressurized fluid circuits, for example compressed air distribution networks in factories or workshops. An object of the invention is to provide an automatic coupler which reliably prevents the "whiplash" phenomenon produced, at the time of uncoupling. In U.S. Pat. No. 5,365,972 there is described an undersea hydraulic coupling with bleed valve.

There is however a need to provide a coupling where the system to close of the transfer path, which may be a fluid path formed by fluid bores or other paths for transferring other media, in one or both of the parts forming the coupling, is not pressure sensitive in relation to the pressure in the fluid surrounding the coupling and or even the pressure in the fluid path that should be closed off. There is also an aim to provide a coupling which not inadvertently will open due to pressure variations and or a large surrounding pressure around the coupling.

BRIEF SUMMARY OF THE INVENTION

These aims are met with a coupling according to the following claims. According to the invention there is provided a coupling comprising a first and a second part, preferably forming a male and a female part. This coupling gives at least one transfer path through the coupling in a connected state of the coupling and wherein a disconnected state of the coupling at least on part of the coupling has at least one protected and or closed transfer path. The transfer path is preferably a fluid path formed by fluid bores in the two parts of the coupling, but it may also be a transfer path, as lines, for transferring of signals, electricity or other media which should be transferred through the coupling. There may also be more than one transfer path through the coupling. By having the transfer path closed or protected one has the possibility of holding a pressurized fluid securely within the coupling and not leaking out to the surroundings or the other way preventing the surrounding fluid to come in contact with or enter into the transfer path in that part of the coupling. The coupling according to the invention may preferably be a quick coupling, where the insertion of one part of the coupling into the other temporarily lock the one part to the other, however the invention is not limited to a quick coupling, it may be a coupling where the part are joined by a threaded connection whether by rotating them relative to each other or having bolt and nut arrangements to provide a connection between them or other solution.

The first part of the coupling comprises a housing with a bore and a slide element arranged movable within the bore, by connection and disconnection of the second part. The second part of the coupling may of course have a similar arrangement. A part of the transfer path in the housing of the first part of the coupling, has an end in the bore and is in contact with a part of the transfer path in the second part when the second part is connected with the first part, but otherwise closed or protected by the slide element. According to the invention the slide element has two end surfaces, which both end surfaces in a disconnected state of the coupling, are exposed to a fluid surrounding the coupling. In a connected state of the coupling one end surface of the slide element is abutting a surface of the second part of the coupling. This abutment will move the slide element relatively within the bore in the housing and connecting the parts of the transfer path to form a continuing transfer path through the coupling. The connection of the transfer paths may be achieved by pushing the slide element away from the open end of the transfer path in the bore, and thereby connecting an opening of the transfer path in the second part with the open end in the bore. The contact between the transfer paths may also be achieved by forming a connecting transfer path through the slide element. This connecting transfer path will come in contact with the open end in the wall of the bore when the slide element is moved by the second part, another end of the connecting transfer path will be in connection with a transfer path in the second part.

By having both end surfaces of the slide element exposed to the surrounding fluid, this gives that the slide element can be formed to be non-responsive to the surrounding fluid and being pressure balanced in relation to the internal fluid within the transfer path in a disconnected state of the coupling and by this also formed so that the coupling will not inadvertently be opened and thereby expose the transfer path in a disconnected state of the coupling. This may be done by having the exposed area one end surface of the slide element at least equal to the area of the opposite end of the slide element, where the equal or larger exposed area is on the end of the slide element which is opposite the end of the slide element abutting the second part in a connected state of the coupling. A pressure in the surrounding fluid will in such a case not tend to move the slide element within the bore, since there are similar pressure forces from the surrounding fluid on both end surfaces of the slide element or tend to move the slide element to a closed position since there is a larger exposed area on one side compared with the other side. The slide element is in addition also pressure balances with regards to the pressure in the fluid in the closed transfer path. This is done by having equal sealing surfaces exposed to the internal fluid within the transfer path, on both sides, seen in a longitudinal direction of the slide element, of the open end of the transfer path in the bore, between the slide element and an internal wall of the bore, in a closed state, disconnected state of the coupling. By this one achieves a coupling which is both balanced with regards to the internal fluid within the transfer path, also balanced to make sure the coupling in a disconnected state not inadvertently exposes the transfer path to the surrounding fluid and also balanced in such a manner that it is relatively easy to connect and disconnect.

The slide element may in an embodiment be pre-tensioned by an elastic element to a given position in a disconnected state of the coupling, where it is closing off and or protecting the end of the part of the transfer path ending in the bore wherein the slide element is arranged movable. This may be done to ensure that the open end of the transfer path in the bore is quickly covered by the slide element.

When the side not abutting the second part is larger than the side abutting the second part, this gives that pressure in the surrounding fluid will tend to move the slide element in a direction of the smaller area exposed, i.e. in such an embodiment there might not be a need for an elastic element for pre-tensioning the slide element in a disconnected state of the coupling since the external pressure will tend move the slide element to the desired location as long as the difference in pressure forces on the areas exposed is larger than the friction force between the slide element and the bore in the housing of the first part of the coupling. Such an embodiment will inherently also give a coupling which is somewhat more difficult to connect in a pressurized environment, since the connection process also will have to overcome the pressure of the surrounding fluid on the side of the slide element not abutting the second part of the coupling. In such an embodiment the slide element has to be limited in its travel within the bore in both directions.

In an embodiment the slide element comprises at least one sealing means to seal off the transfer path from the surrounding fluid in a connected and or non-connected state of the coupling. This may either be one sealing means which is arranged around an open end of the bore in the housing between the slide element and the bore, or one sealing means with a width large enough to cover the open end of the transfer path or a sealing surface around the open end of the transfer path, or two or more sealing means arranged around the circumference of the slide element in abutment between the slide element and the bore in the housing and with at least one on each side of the open end of the transfer path in a disconnected state of the coupling. The sealing means may be arranged in grooves in the surface of the slide element and or the bore in the housing. However it is preferred to have the sealing means arranged on the slide element. Preferably the at least one transfer path through the coupling comprises at least one fluid bore for transferring a fluid.

The elastic element is arranged between a part of the housing and the slide element, keeping the slide element in a given position in a disconnected state of the coupling. This gives that the elastic element may be compressed or stretched in a connected state of the coupling, since the second part of the coupling will tend to move the slide element within the bore when connected to the first part of the coupling, against the pre-tensioning of the elastic element.

In one embodiment where the transfer path is a fluid bore for transferring of fluids, the slide element and or the bore in the housing may comprise a circumferential groove arranged at the open end of the transfer path in a disconnected state of the coupling, this gives an even force distribution around the slide element from a internal fluid within the coupling and also a more even distribution of forces from the internal fluid on the sealing means.

In an embodiment of the invention where the one of the transfer paths is a fluid path, the slide element may comprise a one way valve arrangement, connecting the fluid path in the housing through the slide element with the surrounding fluid in a disconnected state of the coupling. This will allow fluid to pass from the fluid path in the housing to the surrounding fluid, through the slide element, when the internal fluid in the fluid path exceeds a given pressure and or the pressure difference across the one way valve exceeds a given value.

In an embodiment the slide element further has a second circumferential groove interacting with a limitation element arranged within the bore, limiting the movement of the slide element in both directions within the bore. There may be other arrangements limiting the movement of the slide element within the bore, for instance there may be stopper elements arranged at opposite ends of the bore, preventing the slide element form moving further, there may be shoulders within the bore interacting with shoulders formed on the slide element, and the elastic element may form a limitation element, or any combinations of these alternatives or other alternatives.

The coupling may be formed with a system according to the invention on both parts of the coupling, where slide elements arranged in bores in both parts of the coupling are protecting the transfer path in both parts of the coupling in a disconnected state of the coupling.

BRIEF DESCRIPTION OF THE SEVERAL VIEWS OF THE DRAWINGS

The invention will now be explained with explanatory non-limiting embodiments with reference to the attached figures, where;

FIG. 1 shows a cross section through a first embodiment of a coupling according to the invention in a connected state, FIG. 2 shows a first part of the coupling in FIG. 1, in a disconnected state of the coupling, FIG. 3 shows a cross section through a second embodiment of a coupling according to the invention in a connected state, and FIG. 4 shows the first part of the coupling in FIG. 3 in a disconnected state.

DETAILED DESCRIPTION OF THE INVENTION

In FIG. 1 there is shown a first embodiment of a coupling according to the invention in a connected state of the coupling. A first part 1 and a second part 2 is connected forming a through going transfer path through the coupling, with joining a transfer path 8A in the first part 1 and a transfer path 8B in the second part 2. In this connected state of the coupling the second part 2 is pushing a slide element 7 internally within a bore 6 (see FIG. 2) in the first part 1, and thereby joining the transfer path 8a in the first part 1 with the transfer path 8B in the second part 2.

In FIG. 2 there is shown the first part 1 of the coupling in FIG. 1, in a disconnected state of the coupling. The first part comprises a housing 5 with a bore 6 wherein the slide element is arranged movable between two positions shown respectively in FIG. 1 and FIG. 2. The slide element 7 is in FIG. 1 shown pre-tensioned by an elastic element 13 to be in a position where it closes or protects an open end 9 of the transfer path 8A, which in this embodiment is a fluid path which ends in the bore 6. The elastic element 13 will in a connected state of the coupling (FIG. 1) be compressed between a part 14 of the housing and the slide element 7. The slide element 7 has two ends a first end 10 faced towards the second part 2 of the coupling in a connected state of the coupling and a second end surface 11 faced the other way within the bore 6. Both end surfaces 10,11 are exposed to the surrounding fluid in a disconnected state of the coupling by the aperture 19 in the housing close to the second end surface 11 and the opening of the bore 6 wherein the second part 2 of the coupling should be inserted to connect the coupling. In this embodiment the elastic element may not be a impermeable for the surrounding fluid, forming a total second end of the slide element 7 formed by a first end surface 11A and a second end surface 11B, respectively within and outside the elastic element 13. The sum total of the areas exposed on the two end surfaces 10, 11 of the slide element 7 are in this embodiment mainly equal.

The slide element comprises further a circumferential groove 15 which is positioned in connection with the open end 9 of the transfer path 8A in a disconnected state of the coupling and there are two sealing means 12 arranged one on each side of the circumferential groove 15, which sealing means 12 comprises an tensioning element 21 pressing a sealing element 20 outwards into abutment against a wall of the bore 6 sealing the open end 9 of the transfer path 8A of the coupling from the surrounding fluid. A cross section transverse to the longitudinal direction of the bore 6 and the slide element 7 will show that both the bore 6 and the slide element 7 are mainly circular and the sealing means 12 and grove 15 are circumferential. However, it is possible to envisage a cross section of bore 6 and slide element 7 which are more oval or has another configuration.

The slide element comprises further a second circumferential groove 17 interacting with a limitation element 18 arranged in the bore 6 of the housing 5, limiting the movement of the slide element 7 in both directions within the bore 6. In this embodiment there are arranged a connecting element 24 for connecting the parts of the coupling to other elements not shown in the figure.

In FIGS. 3 and 4 there is shown a second embodiment of a coupling according to the invention. Similar elements are given the same reference numeral and it is referred to the description above and just given a description of features in this embodiment not shown in the first embodiment. The transfer path 8A is shown without a connecting element, and the elastic element 13 is in this embodiment shown as a truncated cone shape elastic element 13. The circumferential groove 15 is in this embodiment connected to a radial fluid bore 23 leading from the circumferential groove 15 in to a central bore 25. Within the central bore 25 is there arranged a one way valve arrangement 16 locked into the central bore 25 with a locking disc 22. The one way valve arrangement 16 is allowing fluid in the transfer path 8A to flow from the transfer flow path 8A out to the surrounding fluid if the pressure within the transfer path 8A exceeds a predetermined pressure. The surrounding fluid is prevented from flowing into the transfer path 8a.

The explained embodiment are only exemplary embodiment a skilled person will understand that there may be more than one fluid bore arranged in the housing and slide element, the arrangement for limiting the movement of the slide element may be stepped parts of the bore, there may be more than one aperture in the end of the housing opposite of the side wherein the second part of the coupling should be inserted. Both the first and the second part of the coupling may comprise pressure balanced means to close or protect open ends in the part of the coupling. There may be more than one sealing means arranged on both sides of the open end in a disconnected state of the coupling. The elastic element may be arranged in a different manner, where it is stretched in a connected state of the coupling, or there may not be an elastic element at all in the coupling.

The invention claimed is:

1. A coupling comprising a first part and a second part connectable to each other in a male-female mating arrangement;

said first part having a housing with a bore and a slide element, said slide element being arranged movable within said bore by connection and disconnection of said second part;

a first transfer path in said housing having an open end in said bore and being in contact with a second transfer path in said second part when said second part is connected with said first part but otherwise closed by said slide element, said slide element being moveable from a closed to an open position by interaction with said second part;

said slide element having a first and second end surface, said first end surface in abutment against said second part in a connected state of said coupling, said second end surface in a disconnected state of said coupling being exposed to a surrounding fluid around said coupling, a sum total of areas exposed to the surrounding fluid on said first end surface is at least equal to a sum total of areas exposed to the surrounding fluid on said second end surface; and at least one of said slide element and a surface of said bore having a circumferential groove communicating with said first transfer path in the disconnected state of said coupling;

wherein said slide element having a one way valve arrangement connecting said first transfer path with the surrounding fluid in the disconnected state of said coupling, said valve arrangement allowing fluid to pass from said first transfer path to the surrounding fluid.

2. A coupling according to claim 1 further comprising said first part having at least one sealing means arranged to seal off said open end of said first transfer path from the surrounding fluid in the disconnected state of said coupling.

3. A coupling according to claim 2 further comprising at least two sealing means between said slide element and said surface of said bore, at least one of said at least two sealing means being on each side of said open end when said slide element is positioned to close said first transfer path.

4. A coupling according to claim 1 further comprising said slide element being pre-tensioned by an elastic element arranged between a portion of said housing and said slide element, the elastic element keeping said slide element in a given position in the disconnected state of said coupling.

5. A coupling according to claim 4 further comprising said elastic element being compressed in the connected state of said coupling.

6. A coupling according to claim 1 further comprising said slide element having a second circumferential groove interacting with a limitation element arranged within said bore, said limitation element limiting the movement of said slide element in both directions within said bore.

* * * * *